United States Patent
Tahara

(10) Patent No.: US 10,930,929 B2
(45) Date of Patent: Feb. 23, 2021

(54) NEGATIVE-ELECTRODE MATERIAL FOR LI-ION SECONDARY CELL, METHOD FOR MANUFACTURING SAID MATERIAL, NEGATIVE ELECTRODE FOR LI-ION-SECONDARY-CELL, AND LI-ION SECONDARY CELL

(71) Applicant: JFE Chemical Corporation, Tokyo (JP)

(72) Inventor: Tomoyuki Tahara, Tokyo (JP)

(73) Assignee: JFE CHEMICAL CORPORATION, Tokyo (JP)

( * ) Notice: Subject to any disclaimer, the term of this patent is extended or adjusted under 35 U.S.C. 154(b) by 137 days.

(21) Appl. No.: 16/070,959

(22) PCT Filed: Jan. 6, 2017

(86) PCT No.: PCT/JP2017/000228
§ 371 (c)(1),
(2) Date: Jul. 18, 2018

(87) PCT Pub. No.: WO2017/126337
PCT Pub. Date: Jul. 27, 2017

(65) Prior Publication Data
US 2019/0081323 A1    Mar. 14, 2019

(30) Foreign Application Priority Data
Jan. 22, 2016  (JP) .............................. JP2016-010323

(51) Int. Cl.
*H01M 4/485* (2010.01)
*H01M 4/1391* (2010.01)
(Continued)

(52) U.S. Cl.
CPC ......... *H01M 4/485* (2013.01); *H01M 4/0471* (2013.01); *H01M 4/131* (2013.01);
(Continued)

(58) Field of Classification Search
CPC .... H01M 4/485; H01M 4/0471; H01M 4/134; H01M 4/1391; H01M 4/1395;
(Continued)

(56) References Cited

U.S. PATENT DOCUMENTS

| 6,893,621 B2 | 5/2005 | Fukuoka et al. |
| 2006/0147797 A1 | 7/2006 | Wu et al. |

(Continued)

FOREIGN PATENT DOCUMENTS

| CN | 103682268 B | 1/2016 |
| EP | 2930146 A1 | 10/2015 |

(Continued)

OTHER PUBLICATIONS

International Search Report and Written Opinion for International Application No. PCT/JP2017/000228, dated Apr. 4, 2017—6 pages.

(Continued)

*Primary Examiner* — Helen Oi K Conley
(74) *Attorney, Agent, or Firm* — RatnerPrestia

(57) ABSTRACT

The present invention provides a Li-ion secondary cell negative-electrode material with which it is possible to adequately suppress reductive decomposition of a liquid electrolyte by an active material during charging, the Li-ion secondary cell negative-electrode material exhibiting a high discharge capacity that exceeds the theoretical capacity of graphite and exceptional initial charging efficiency and cycle characteristics. In this negative-electrode material for a Li-ion secondary cell, the surfaces of particles of $SiO_x$ ($0 \leq x < 2$) contain Li and at least one metallic element M selected from among Si, Al, Ti, and Zr, and have a coating of a Li-containing oxide comprising a composition in which M/Li>5 with respect to the molar ratio.

17 Claims, 1 Drawing Sheet

(51) Int. Cl.
  *H01M 4/48* (2010.01)
  *H01M 4/36* (2006.01)
  *H01M 4/1395* (2010.01)
  *H01M 4/38* (2006.01)
  *H01M 4/62* (2006.01)
  *H01M 4/134* (2010.01)
  *H01M 4/131* (2010.01)
  *H01M 4/04* (2006.01)
  *H01M 10/0525* (2010.01)
  *H01M 4/02* (2006.01)

(52) U.S. Cl.
  CPC ......... *H01M 4/134* (2013.01); *H01M 4/1391* (2013.01); *H01M 4/1395* (2013.01); *H01M 4/366* (2013.01); *H01M 4/386* (2013.01); *H01M 4/483* (2013.01); *H01M 4/62* (2013.01); *H01M 4/364* (2013.01); *H01M 10/0525* (2013.01); *H01M 2004/027* (2013.01)

(58) Field of Classification Search
  CPC ...... H01M 4/366; H01M 4/386; H01M 4/483; H01M 4/62; H01M 4/364; H01M 10/0525; H01M 4/131
  See application file for complete search history.

(56) References Cited

U.S. PATENT DOCUMENTS

| | | | |
|---|---|---|---|
| 2010/0143804 A1 | 6/2010 | Mah et al. | |
| 2011/0086271 A1* | 4/2011 | Lee | H01M 4/485 429/220 |
| 2011/0097627 A1 | 4/2011 | Watanabe et al. | |
| 2012/0328915 A1 | 12/2012 | Hirose et al. | |
| 2014/0057176 A1 | 2/2014 | Park et al. | |
| 2017/0200943 A1 | 7/2017 | Kawakami | |

FOREIGN PATENT DOCUMENTS

| | | | |
|---|---|---|---|
| JP | 2000067865 A | 3/2000 |
| JP | 2003160328 A | 6/2003 |
| JP | 2006190642 A | 7/2006 |
| JP | 2008041465 A | 2/2008 |
| JP | 2009135094 A | 6/2009 |
| JP | 2011096455 A | 5/2011 |
| JP | 2011113862 A | 6/2011 |
| JP | 2013008587 A | 1/2013 |
| JP | 2013073818 A | 4/2013 |
| JP | 5385111 B2 | 10/2013 |
| JP | 2014220216 A | 11/2014 |
| KR | 20140026855 A | 3/2014 |
| KR | 20140026855 A | 3/2017 |
| WO | 2016010056 A1 | 1/2016 |

OTHER PUBLICATIONS

Japanese Notification of Reasons for Refusal for Japanese Application No. 2017-562507, dated May 14, 2019 with translation, 6 pages.

Extended European Search Report for European Application No. 17741217.8, dated Jul. 16, 2019, 8 pages.

Korean Office Action for Korean Application No. 10-2018-7018830, dated Sep. 23, 2019 with translation, 7 pages.

* cited by examiner

NEGATIVE-ELECTRODE MATERIAL FOR LI-ION SECONDARY CELL, METHOD FOR MANUFACTURING SAID MATERIAL, NEGATIVE ELECTRODE FOR LI-ION-SECONDARY-CELL, AND LI-ION SECONDARY CELL

CROSS REFERENCE TO RELATED APPLICATIONS

This is the U.S. National Phase application of PCT/JP2017/000228, filed Jan. 6, 2017, which claims priority to Japanese Patent Application No. 2016-010323, filed Jan. 22, 2016, the disclosures of each of these applications being incorporated herein by reference in their entireties for all purposes.

FIELD OF THE INVENTION

The present invention relates to a negative electrode material for a Li-ion secondary battery, in which a Li-ion conductive metal oxide is coated on particle surfaces of Si or SiO capable of alloying with Li, and a manufacturing method thereof.

BACKGROUND OF THE INVENTION

A Li-ion secondary battery has been widely used as a power source for an electronic device, owing to its excellent properties including a high voltage and a high energy density. Recently, electronic devices have been miniaturized with improved performances, and there is a growing demand for achievement of the higher energy density in a Li-ion secondary battery.

Current Li-ion secondary batteries normally make use of $LiCoO_2$ and graphite for a positive electrode and a negative electrode, respectively. While graphite used for a negative electrode is excellent in the charge-discharge reversibility, the discharging capacity thereof has already reached a value close to 372 mAh/g, corresponding to the theoretical value of the intercalation compound $LiC_6$. Therefore, in order to achieve the higher energy density, there is a need to develop a negative electrode material having a larger discharging capacity than that of graphite.

In this regard, as an active material having the far larger discharging capacity than that of graphite and forming an alloy with Li, Si and SiO have been drawing attention to serve as a negative electrode material in place of graphite. An Si-based negative electrode expands so largely in volume in alloying during charging as to easily deteriorate; reduction in particle size of particles is considered to be an effective solution to reduce the expansion. However, since the active material surface is activated as the particle size is reduced, reduction-decomposition of an electrolytic solution is promoted during charging. Therefore, the cycle characteristics at a practical level have not been achieved.

Patent Literature 1 teaches that when a high-capacity active material such as Si or SiO is coated on its surface with a hard coating of a general formula $Li_xM_yO$ (where M is a metal or Si, and y/x=0.5 to 2), the volume change of the active material due to charging and discharging is decreased, and the capacity retention rate through a cycle is excellent. However, the coating substance does not have excellent Li-ion conductivity, and the presence of the coating causes capacity reduction and deterioration in rapid charging-discharging. In addition, even when a fluoroethylene carbonate (FEC) additive that is regarded as effective in improving the cycle characteristics of an Si-based active material is added, an effect of improvement cannot be obtained.

Patent Literature 2 teaches that when an active material is coated with a composite coating comprising ceramic nanoparticles having a median particle diameter of not more than 100 nm and an organic solid electrolyte interface (SEI), the ion dispersibility improves. However, since an oxide is not densely coated, an electrolytic solution comes in contact with the active material during charging so that reduction-decomposition proceeds.

Patent Literature 3 teaches that when $TiO_2$ or $ZrO_2$ as an artificial SEI is coated on Si particle surfaces, the cycle life is prolonged. However, $TiO_2$ or $ZrO_2$ free of Li has poor Li-ion conductivity and hence causes capacity reduction and deterioration in rapid charging-discharging.

PATENT LITERATURES

Patent Literature 1: JP 5385111 B
Patent Literature 2: JP 2008-041465 A
Patent Literature 3: JP 2006-190642 A

SUMMARY OF THE INVENTION

The present invention has been made in view of the foregoing situation and aims at providing a negative electrode material for a Li-ion secondary battery being capable of sufficiently suppressing reduction-decomposition of an electrolytic solution owing to the presence of an active material during charging, and having a higher discharging capacity than the theoretical capacity of graphite and excellent initial charging-discharging efficiency and cycle characteristics.

The present inventor has discovered that when Si particles or SiO particles as an active material are coated on their surfaces with thin coatings of a Li-containing oxide comprising Li and another specific metal element at a predetermined molar ratio and having high Li-ion conductivity with high stability, the active material is prevented from coming into contact with an electrolytic solution to thereby suppress reduction-decomposition of the electrolytic solution, and a high discharging capacity and good cycle characteristics can be obtained without hindering charging-discharging reaction that is accompanied by Li-ion conduction.

The reason for obtaining such a high discharging capacity and cycle characteristics as described above should be supposedly because, by having thin coatings of the foregoing Li-containing oxide having high Li-ion conductivity with high stability coated on particle surfaces of Si or SiO that is an active material, contact between the active material and the electrolytic solution is regulated, reduction-decomposition of the electrolytic solution owing to the presence of the active material during charging can be suppressed, and charging-discharging reaction accompanied by Li-ion conduction is not hindered. The present invention however is not limited to this mechanism.

Specifically, the present invention according to exemplary embodiments provides the following.

(1) A negative electrode material for a Li-ion secondary battery, the negative electrode material having, on $SiO_x$ ($0 \leq x < 2$) particle surfaces, coatings of a Li-containing oxide that includes Li and at least one kind of a metal element M selected from Si, Al, Ti and Zr and has a composition of M/Li>5 in molar ratio.

(2) The negative electrode material for a Li-ion secondary battery according to (1) above, wherein the M/Li is 5<M/Li<100.

(3) The negative electrode material for a Li-ion secondary battery according to (1) or (2), wherein a content of the Li-containing oxide is 2 to 10 mass %.

(4) A negative electrode for a Li-ion secondary battery containing the negative electrode material according to any one of (1) to (3) above.

(5) A Li-ion secondary battery including the negative electrode for a Li-ion secondary battery according to (4) above.

(6) A manufacturing method of a negative electrode material for a Li-ion secondary battery comprising dispersing $SiO_x$ ($0 \le x < 2$) particles in an oxide precursor solution containing at least one kind of a metal element M selected from Si, Al, Ti and Zr, and Li, and performing heat treatment at temperature in a range of 200 to 1,200° C. after drying, thereby obtaining the negative electrode material according to any one of (1) to (3) above.

The negative electrode material for a Li-ion secondary battery of the present invention can sufficiently suppress excessive reduction-decomposition of an electrolytic solution owing to the presence of an active material during charging and has a higher discharging capacity than the theoretical charging capacity of graphite and excellent cycle characteristics.

DETAILED DESCRIPTION OF EMBODIMENTS OF THE INVENTION

Below described in detail is a specific embodiment of the present invention.

[Negative Electrode Material for Li-Ion Secondary Battery of Present Invention]

The negative electrode material for a Li-ion secondary battery according to embodiments of the present invention has coatings of a Li-containing oxide with stable and high Li-ion conductivity formed on particle surfaces of $SiO_x$ ($0 \le x < 2$) that is an active material, whereby the contact between the active material and an electrolytic solution can be regulated to suppress reduction-decomposition of the electrolytic solution owing to the presence of the active material during charging, and charging-discharging reaction accompanied by Li-ion conduction is not hindered so that discharging capacity does not decrease and good charging-discharging reaction with high current is provided. The coating has a thickness of preferably 0.5 to 10 nm and more preferably 1 to 3 nm. If the coating thickness is less than 0.5 nm, contact between the active material and the electrolytic solution would not be sufficiently prevented. If the coating thickness exceeds 10 nm, the resistance of Li-ion conduction and electronic conduction would increase and the electrode reactivity would deteriorate. The Li-containing oxide coating weight, i.e., the amount of the Li-containing oxide in the negative electrode material for a Li-ion secondary battery of the present invention varies depending on a specific surface area of the $SiO_x$ ($0 \le x < 2$) particles that are the active material. When the coating thickness falls within the foregoing range, the Li-containing oxide coating weight, i.e., the amount of the Li-containing oxide in the negative electrode material for a Li-ion secondary battery of the present invention is preferably 2 to 10 mass %. If the amount of the Li-containing oxide in the negative electrode material for a Li-ion secondary battery of the present invention is less than 2 mass %, contact between the active material and the electrolytic solution would not be sufficiently prevented. If the amount of the Li-containing oxide in the negative electrode material for a Li-ion secondary battery of the present invention is more than 10 mass %, the resistance of Li-ion conduction and electronic conduction would increase and the electrode reactivity would deteriorate.

Figure 2:
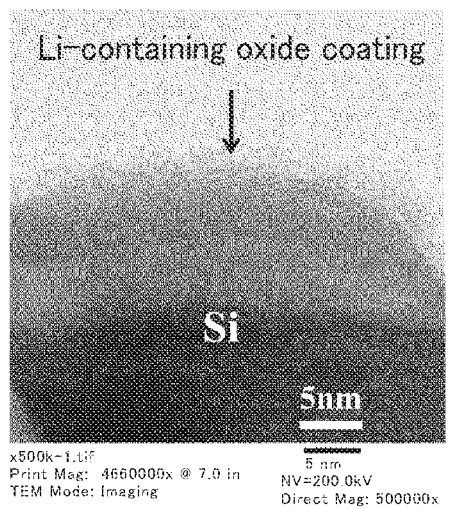
FIG. 2 is a TEM photograph showing a surface portion of a Si particle having a Li-containing oxide coating.

FIG. 2 is a TEM image of a coated Si particle of Example 1 to be described below. The coated Si particle shown in FIG. 2 is a Si particle being the active material coated on its surface with a 2 to 3 nm thin coating of the Li-containing oxide having a composition of M/Li=10 (M:Al) in molar ratio.

In the negative electrode material for a Li-ion secondary battery of the present invention, the coatings formed on at least part of the surfaces of $SiO_x$ ($0 \le x < 2$) particles being the active material are formed of a Li-containing oxide having stable and high Li-ion conductivity. The metal oxide as a matrix in which Li is to be contained is at least one kind selected from $SiO_2$, $Al_2O_3$, $TiO_2$ and $ZrO_2$.

The Li-containing oxide in an embodiment of the present invention is composed of Li and a metal element M at a molar ratio of M/Li>5. If the composition is M/Li≤5 in molar ratio, the Li-ion conductivity would become smaller, and the discharging capacity would decrease or the electrode reactivity would become poor.

The Li-containing oxide in the present invention preferably has the composition of 100>M/Li>5 in molar ratio. If the composition is M/Li≥100 in molar ratio, the Li-ion conductivity would become smaller, and the discharging capacity would decrease or the electrode reactivity would become poor.

The Li-containing oxide in the present invention preferably has the composition of 20≥M/Li≥6 in molar ratio.

The crystal phase of the Li-containing oxide in the present invention is affected by the heat treatment temperature. Generally, crystallization does not proceed at a heat treatment temperature of 200 to 600° C. so that the Li-containing oxide is in the amorphous form, and crystal formation begins at a temperature of 600° C. or higher. In particular, when the Li-containing oxide includes Si as the metal element M, a mixed phase of $SiO_2$ in the amorphous phase or the crystal phase (tridymite type) and $Li_2Si_2O_5$ is formed. When the Li-containing oxide includes Al as the metal element M, a mixed phase of $Al_2O_3$ in the amorphous phase or the crystal phase (y type) and $LiAl_5O_8$ is formed. When the Li-containing oxide includes Ti as the metal element M, a mixed phase of $TiO_2$ in the amorphous phase or the crystal phase (anatase type, rutile type) and $Li_4Ti_5O_{12}$ is formed. When the Li-containing oxide includes Zr as the metal element M, a mixed phase of $ZrO_2$ in the amorphous phase or the crystal phase (monoclinic, tetragonal) and $Li_2ZrO_3$ is formed.

[Raw Material of Negative Electrode Material for Li-Ion Secondary Battery of Present Invention]

<Active Material>

The negative electrode material for a Li-ion secondary battery according to embodiments of the present invention uses, as the active material, particles of $SiO_x$ ($0 \le x < 2$) that alloys with Li. The crystal phase of $SiO_x$ may be either amorphous or crystalline and is not particularly limited.

When x=0 is established, $SiO_x$ ($0 \le x < 2$) particles are Si particles. In this case, the mean particle diameter $D_{50}$ is preferably not more than 1 μm. If the mean particle diameter $D_{50}$ exceeds 1 μm, an influence from charge-induced swelling would locally become large so as to accelerate deterioration of the electrode. The mean particle diameter $D_{50}$ is preferably not less than 0.1 μm. If the mean particle diameter $D_{50}$ is less than 0.1 μm, the surfaces of Si particles as the active material are so highly activated that it would be difficult to regulate reduction-decomposition of the electrolytic solution with the coatings during charging. The mean particle diameter $D_{50}$ more preferably falls within the range of 0.1 μm to 0.5 μm. The particle shape may be either a spherical shape as a result of synthesis through the gas-phase method, a flake shape or a fibrous shape, or a fragment shape resulting from fracture of lumps, and is not particularly limited.

When $0<x<2$ is established, $SiO_x$ is entirely amorphous or in the uneven state where Si crystal particles with a size of several nanometers are evenly dispersed in an amorphous $SiO_2$ matrix. Meanwhile, it is said that when about $0.5 \le x \le 1.5$ is established, $SiO_x$ takes on a monophase and is stable. The mean particle diameter $D_{50}$ of $SiO_x$ at this time is preferably not more than 10 μm. If the mean particle diameter $D_{50}$ exceeds 10 μm, an influence from charge-induced swelling would locally become large so as to accelerate deterioration of the electrode. The mean particle diameter $D_{50}$ is preferably not less than 0.1 μm. If the mean particle diameter $D_{50}$ is less than 0.1 μm, the surface of the active material is so highly activated that it would be difficult to regulate reduction-decomposition of the electrolytic solution during charging with the coatings. The mean particle diameter $D_{50}$ more preferably falls within the range of 0.1 μm to 5 μm. The particle shape may be either a spherical shape as a result of synthesis through the gas-phase method, a flake shape or a fibrous shape, or a fragment shape resulting from fracture of lumps, and is not particularly limited.

<Li-Containing Oxide Precursor Solution>

In a liquid solution (Li-containing oxide precursor solution) in which a Li compound that is a precursor of the Li-containing oxide and a compound of a metal element M that is at least one kind selected from Si, Al, Ti and Zr are dispersed, when a solvent is organic, the Li compound serving as a Li source is preferably lithium acetate, lithium nitrate, lithium chloride or the like that is soluble in the organic solvent, while the metal element M compound serving as a metal element M source is preferably alkoxide, nitrate, chloride or the like that is soluble in the organic solvent. Among alkoxides, those having Al, Ti or Zr as the metal element M are readily hydrolyzed and thus unstable, and are preferably stabilized by a chelate agent. Examples of the chelate agent include, but are not limited to, ethyl acetoacetate, acetylacetone, and triethanolamine. For the organic solvent, ethanol, isopropyl alcohol, ethyl acetate, toluene or the like may be used. When the solvent is water, the compound serving as the Li source is preferably lithium acetate, lithium nitrate, lithium chloride or the like that is soluble in water, while the metal element M compound serving as the metal element M source is preferably nitrate, chloride, oxyacid salt, peroxo acid or the like that is soluble in water. When the metal element M is Si, an aqueous lithium silicate solution may also be used.

[Manufacturing Method of Negative Electrode Material for Li-Ion Secondary Battery of Present Invention]

The manufacturing method of the negative electrode material for a Li-ion secondary battery according to embodiments of the present invention comprises: adding the $SiO_x$ ($0 \le x<2$) particles capable of alloying with Li to a liquid solution (Li-containing oxide precursor solution) having, dispersed therein, the Li compound as the precursor of the Li-containing oxide and the compound of at least one kind of metal element M selected from Si, Al, Ti and Zr, and performing heat treatment at temperature in a range of 200 to 1,200° C. after drying. In a case where the negative electrode material for a Li-ion secondary battery after the heat treatment is agglomerated, the material can be crushed with a force with which the Li-containing oxide coatings are not damaged.

The liquid solution (Li-containing oxide precursor solution) in which the Li compound as the Li-containing oxide precursor and the compound of at least one kind of metal element M selected from Si, Al, Ti and Zr are dispersed is preferably stabilized through chelating alkoxide of the metal element M in an alcohol solvent, when the element M is Al, Ti or Zr, with a chelate agent such as ethyl acetoacetate, acetylacetone, and triethanolamine, thereby suppressing rapid hydrolysis reaction and improving coating formability. The blending ratio of the chelate agent is preferably a chelate agent/alkoxide=1 to 2 in molar ratio. If the blending ratio is less than 1 in molar ratio, alkoxide that has not been chelated would remain and impair stability, and if the blending ratio is more than 2 in molar ratio, excessive chelate agent that is not consumed in chelating would remain. To the liquid solution of chelated alkoxide, more preferably, water is added so that hydrolysis is suitably promoted to further improve the coating formability. The addition amount of water is preferably water/alkoxide=1 to 2 in molar ratio. If the addition amount is less than 1 at a molar ratio, the hydrolysis would not sufficiently proceed so that organic components would be apt to remain during coating formation, and if the addition amount exceeds 2 in molar ratio, the hydrolysis would excessively proceed so that precipitation would occur in the solution in some cases. Next, the Li compound is dissolved in a solvent and is mixed in the foregoing liquid solution, whereby the liquid solution in which the Li-containing oxide precursor is dispersed can be prepared. In a case where the metal element M is Si, alkoxide thereof is stable so that a chelate agent is not necessary; the hydrolysis is accelerated as a result of addition of water and an acid catalyst, and thereafter the Li compound is dissolved in a solvent and is mixed in the foregoing liquid solution, whereby the liquid solution in which the Li-containing oxide precursor is dispersed can be prepared.

Next, $SiO_x$ ($0 \le x<2$) particles capable of alloying with Li are added to the foregoing liquid solution. $SiO_x$ may take either a dried powder form or a dispersion slurry form. Such dried powder can be obtained by dry-milling the $SiO_x$ raw material, or by wet-milling the $SiO_x$ raw material and thereafter removing a solvent. The dispersed slurry can be obtained by wet-milling. From the mixed slurry of the dispersion solution of the Li-containing oxide precursor and $SiO_x$ particles, the solvent is removed, and Li-containing oxide precursor coatings are formed on the $SiO_x$ particle surfaces. The Li-containing oxide precursor coatings are preferably subjected to teat treatment at temperature of 200 to 1,200° C. to accelerate hardening. If the temperature is less than 200° C., hardness of the coatings would be low and adhesion to the $SiO_x$ particles would be weak, and if the temperature exceeds 1,200° C., the reaction between the coatings and $SiO_x$ would proceed to decrease the discharging capacity. The heat treatment atmosphere is preferably a non-oxidizing atmosphere, a non-reactive gas such as Ar or a low-reactive gas such as $N_2$ is used as a main component, and the $O_2$ concentration is preferably not more than 1,000 ppm.

The negative electrode material for a Li-ion secondary battery of the present invention may be used in combination with a different graphite material or a carbon material such as a hard carbon for the purpose of adjusting the battery properties including the capacity, density and efficiency of the electrode to be prepared.

[Negative Electrode]

The negative electrode for a Li-ion secondary battery of the present invention is a negative electrode for a lithium ion secondary battery containing the above-described negative electrode material for a Li-ion secondary battery.

The negative electrode for a lithium ion secondary battery according to embodiments of the present invention is prepared in accordance with a normal forming method of a negative electrode. The negative electrode is preferably manufactured by coating a current collector with a negative electrode mixture prepared by adding a binder and a solvent to the negative electrode material for a Li-ion secondary battery according to embodiments of the present invention. The binder is preferably one that is chemically and electrochemically stable against an electrolyte and can make use of, for example, powders of fluororesins such as polytetrafluoroethylene and polyvinylidene fluoride, powders of resins such as polyethylene and polyvinyl alcohol, and carboxymethyl cellulose. Two or more thereof may be used in combination. The binder normally accounts for 1 to 20 mass % of the total amount of the negative electrode mixture.

More specifically, the negative electrode material for a Li-ion secondary battery of the present invention is adjusted to a desired particle size through classification, for example, and is then mixed with the binder and the solvent to prepare the negative electrode mixture in a slurry form. That is, the negative electrode material for a Li-ion secondary battery of the present invention, the binder and the solvent such as water, isopropyl alcohol, N-methylpyrrolidone, dimethylformamide are mixed and stirred by means of a known agitator, mixer, kneader or the like to prepare a slurry. The slurry is coated on either surface or both surfaces of the current collector and dried, whereby the negative electrode to which a negative electrode mixture layer is evenly and firmly adhered can be obtained. The negative electrode mixture layer has a thickness of 10 to 200 μm, and preferably 20 to 100 μm.

The shape of the current collector to be used to prepare the negative electrode is not particularly limited and is, for example, a foil-like shape, a mesh shape, or a net-like shape such as an expanded metal shape. The material of the current collector is preferably copper, stainless steel, nickel or the like, and the current collector normally has a thickness of 5 to 20 μm.

The negative electrode for a Li-ion secondary battery of the present invention may be mixed with a carbon material such as a graphite material and hard carbon and a conductive material such as CNT as long as the object of the present invention is not impaired.

[Lithium Ion Secondary Battery]

The Li-ion secondary battery according to embodiments of the present invention is structured such that the foregoing negative electrode for a Li-ion secondary battery, a positive electrode and a non-aqueous electrolyte are stuck in the order of, for example, the negative electrode, the non-aqueous electrolyte and the positive electrode, and accommodated in an exterior member of the battery. In a case where the non-aqueous electrolyte is dissolved in a solvent, a separator is disposed between the negative electrode and the positive electrode. The structure, shape and configuration of the Li-ion secondary battery of the present invention are not particularly limited and may be arbitrarily selected from a cylindrical type, a square type, a coin type, a button type, a laminate type and others, depending on the intended use. In order to attain a sealed non-aqueous electrolyte battery with the higher safety, preferably utilized is one equipped with means of detecting a rise in the battery internal pressure upon occurrence of abnormality such as overcharge and cutting off the current.

<Positive Electrode>

The positive electrode is formed by coating the surface of the current collector with a positive electrode mixture comprising a positive electrode material, a binder and a solvent, for example. As a positive electrode active material, a lithium-containing transition metal oxide that can occlude/release lithium in a sufficient amount is preferably selected. The lithium-containing transition metal oxide is a composite oxide of lithium and a transition metal and may include four or more elements. A single composite oxide may be used alone, or two or more composite oxides may be used in combination. Specific examples thereof include $LiCoO_2$, $LiNiO_2$, $LiMnO_2$, $LiNi_{0.9}Co_{0.01}O_2$, $LiNi_{0.5}Co_{0.5}O_2$ and $LiFePO_4$.

As the positive electrode active material, one of the foregoing compounds may be used alone or two or more thereof may be used in combination. In forming the positive electrode, various additives including a conductive agent and a binder that are conventionally known can be suitably used.

The shape of the current collector is not particularly limited and is, for example, a foil-like shape, a mesh shape, or a net-like shape such as an expanded metal shape. The material of the current collector is aluminum, stainless steel, nickel or the like, and the current collector normally has a thickness of 10 to 40 μm.

<Non-Aqueous Electrolyte>

The non-aqueous electrolyte to be used in the Li-ion secondary battery according to embodiments of the present invention may be an electrolyte salt that is used for an ordinary non-aqueous electrolytic solution, i.e., a lithium salt such as $LiPF_6$, $LiBF_4$, $LiAsF_6$, $LiClO_4$, $LiB(C_6H_5)$, LiCl, LiBr, $LiCF_3SO_3$, $LiCH_3SO_3$, $LiN(CF_3SO_2)_2$, $LiC(CF_3SO_2)_3$, $LiN(CF_3CH_2OSO_2)_2$, $LiN(CF_3CF_2OSO_2)_2$, $LiN(HCF_2CF_2CH_2OSO_2)_2$, $LiN((CF_3)_2CHOSO_2)_2$, $LiB[\{C_6H_3(CF_3)_2\}]_4$, $LiAlCl_4$, or $LiSiF_6$. From the oxidative stability point of view, $LiPF_6$ and $LiBF_4$ are particularly preferable. The electrolyte salt concentration in the electrolytic solution is preferably 0.1 to 5 mol/L, more preferably 0.5 to 3.0 mol/L.

The non-aqueous electrolyte may be a liquid non-aqueous electrolyte, or a polyelectrolyte such as a solid electrolyte or a gel electrolyte. When the former is used, the non-aqueous electrolyte battery is structured as a so-called Li-ion secondary battery, and when the latter is used, the non-aqueous electrolyte battery is structured as a polyelectrolyte battery including a solid polyelectrolyte battery and a gel polyelectrolyte battery.

As an electrolytic solution used to prepare the non-aqueous electrolytic solution, for example, an aprotic organic solvent comprising a carbonate such as ethylene carbonate, propylene carbonate, dimethyl carbonate or diethyl carbonate, an ether such as 1,1- or 1,2-dimethoxyethane, 1,2-diethoxyethane, tetrahydrofuran, 2-methyltetrahydrofuran, γ-butyrolactone, 1,3-dioxolan, 4-methyl-1,3-dioxolan, anisole or diethyl ether, a thioether such as sulfolane or methyl sulfolane, a nitrile such as acetonitrile, chloronitrile or propionitrile, or trimethyl borate, tetramethyl silicate, nitromethane, dimethylformamide, N-methylpyrolidone, ethyl acetate, trimethyl orthoformate, nitrobenzene, benzoyl chloride, benzoyl bromide, tetrahydrothiophene, dimethylsulfoxide, 3-methyl-2-oxazolidone, ethylene glyocol, or dimethyl sulfite may be used. In addition, in order to prevent deterioration of the battery as a result of reduction-decomposition of the electrolytic solution during charging, an additive may be added. While fluoroethylene carbonate (FEC), vinylene carbonate (VC) and ethylene sulfite (ES) are known as additives, the additive to be added is not limited thereto. The addition amount thereof is normally about 0.5 to 10 mass %.

<Separator>

When the non-aqueous electrolyte is dissolved in a solvent in the Li-ion secondary battery of the present invention, a separator is disposed between the negative electrode and the positive electrode. The material of the separator is not particularly limited and can make use of woven fabric, non-woven fabric and a fine porous film made of synthetic resin, for example. While a fine porous film made of synthetic resin is suitable for the material of the separator, a polyolefin-based fine porous film is particularly preferable from a perspective of its properties including thickness, film strength, and film resistance. In particular, a polyethylene fine porous film and a polypropylene fine porous film, and a composite fine porous film thereof are preferable.

EXAMPLES

Figure 1:
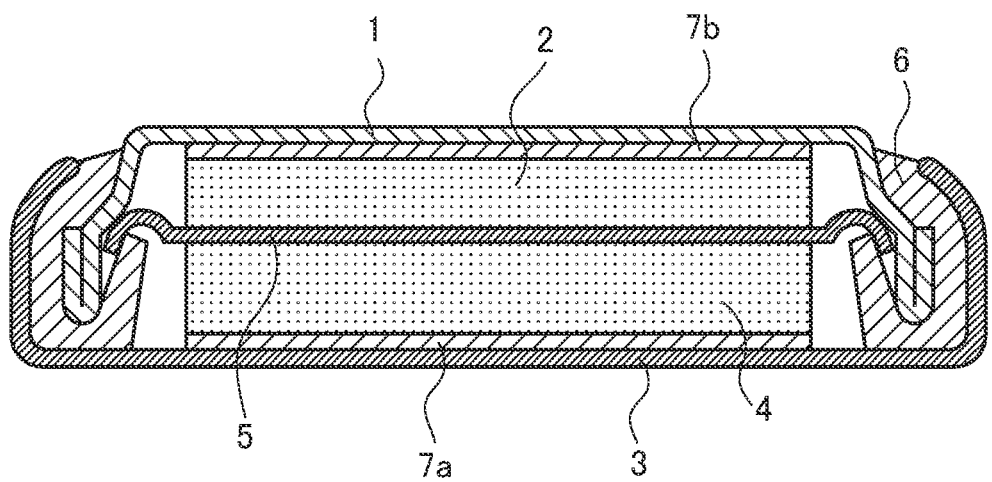
FIG. 1 is a cross section of a button type secondary battery for evaluation of a single electrode.

Next, the present invention is specifically described in reference to Examples, to which the present invention is in no way limited. In each of Examples and Comparative Examples described below, produced and evaluated was a button-type secondary battery for single electrode evaluation comprising a current collector (negative electrode) 7b, to at least part of the surface of which a negative electrode mixture 2 including the negative electrode material of the present invention was adhered, and a counter electrode (positive electrode) 4 made of lithium foil, as illustrated in FIG. 1. A real battery can be produced based on the concept of the present invention in accordance with a known method.

The measurement method used in Examples is described below.

[Measurement Method]

(1) Measurement of mean particle diameter

The particle diameter with which a cumulative frequency measured by a laser diffraction particle size analyzer was 50% by volume was determined as the mean particle diameter.

(2) Content proportion between Li and at least one kind of metal element M selected from Si, Al, Ti and Zr in Li-containing oxide The metal element M content was defined using the addition amount. When a quantitative measurement is made, the inductively coupled plasma spectrometry or the atomic absorption analysis can be adopted.

(3) Observation of coating

Coatings were observed with transmission electron microscope (TEM) photographs.

(4) Battery properties

A battery for evaluation produced to have the following structure was subjected to the charging-discharging test shown below at a temperature of 25° C., and the initial charging-discharging properties, rapid charging rate, rapid discharging rate and cycle characteristics were calculated.

<Initial Charging-Discharging Properties>

Constant-current charging at 0.2C (0.9 mA) was performed until the circuit voltage reached 0 mV, and when the circuit voltage reached 0 mV, the constant-current charging was changed to constant-voltage charging. Charging was further continued until the current value reached 20 µA. Based on the current amount supplied during the foregoing process, the charging capacity per mass (unit: mAh/g) was obtained. Thereafter, the battery was retained for 120 minutes. Next, constant-current discharging at the current value of 0.2C was performed until the circuit voltage reached 1.5 V, and based on the current amount supplied during the process, the discharging capacity per mass (unit: mAh/g) was obtained. The initial charging-discharging efficiency was calculated by the following equation (1).

The 1C charging rate being a rapid charging rate was calculated in such a manner that constant-current discharging at the current value of 0.2C as above was performed until the circuit voltage reached 1.5 V, charging at 1C was then performed until the circuit voltage reached 0 mV, and the rapid charging rate was calculated by the following equation (2).

The 2.5C discharging rate being a rapid discharging rate was calculated in such a manner that constant-current charging at 0.2C was performed until the circuit voltage reached 0 mV, constant-current discharging at the current value of 2.5C was performed until the circuit voltage reached 1.5 V, and the rapid discharging rate was calculated by the following equation (3).

In the test, the process in which lithium ions are occluded in the negative electrode material is defined as charging, whereas the process in which lithium ions are released from the negative electrode material is defined as discharging; the test results are shown in Table 1.

The 1C charging-discharging rate refers to a relative rate index of the current during charging-discharging with respect to the battery capacity and is a current value at which charging-discharging of a cell having a capacity of nominal capacity value terminates in exactly one hour with constant-current charging-discharging.

$$\text{Initial charging-discharging efficiency (\%)} = (\text{discharging capacity/charging capacity}) \times 100 \quad \text{Equation (1)}$$

$$\text{1C charging rate (\%)} = (\text{1C charging capacity/0.2C discharging capacity}) \times 100 \quad \text{Equation (2)}$$

$$\text{2.5C discharging rate (\%)} = (\text{2.5C discharging capacity/0.2C charging capacity}) \times 100 \quad \text{Equation (3)}$$

<Cycle Characteristics>

In addition to the battery for evaluation whose discharging capacity per mass, rapid charging rate, and rapid discharging rate were evaluated, a separate battery for evaluation was produced and evaluated as described below.

Constant-current charging at 1C was performed until the circuit voltage reached 0 mV and was changed to constant-voltage charging. Charging was kept until the current value reached 20 µA, and then charging was paused for 120 minutes. Next, constant-current discharging at the current value of 1C was performed until the circuit voltage reached 1.5 V. This operation was repeated 30 times. The capacity retention rate was calculated by the following equation (4) based on the obtained discharging capacity per mass to evaluate the cycle characteristics. The efficiency of each operation was calculated by the following equation (5) based on the charging capacity and the discharging capacity in each cycle and was evaluated. It is noted that, since the sum of the charge amount of the active material and the charge consumption amount consumed in reduction-decomposition of the electrolytic solution becomes a denominator, the larger value of the efficiency of each operation indicates that the electrolytic solution is harder to decompose.

Capacity retention rate (%)=(discharging capacities of 30 cycles/discharging capacity of first cycle)×100  Equation (4)

Efficiency of each operation (%)=(discharging capacities of 30 cycles/charging capacities of 30 cycles)×100  Equation (5)

Preparation of Negative Electrode Material

Example 1

A first liquid solution was prepared by dissolving 0.02 mol of Al-sec-butoxide and 0.02 mol of ethyl acetoacetate in an isopropanol solvent. Then, an ethanol solution having 0.002 mol of lithium acetate dihydrate dissolved therein was added to the first liquid solution, whereby a second liquid solution was prepared. Subsequently, 29 g of Si particles with the mean particle diameter of 0.15 μm were added to the second liquid solution, the solvent was removed from the mixture, and the resultant was baked in a non-oxidizing atmosphere of nitrogen at 1,000° C., thereby obtaining Si particles with Li-containing oxide coatings containing Li and Al as the metal element M.

Example 2

A first liquid solution was prepared by dissolving 0.02 mol of Ti-isopropoxide and 0.04 mol of ethyl acetoacetate in an isopropanol solvent. Then, an ethanol solution having 0.002 mol of lithium acetate dihydrate dissolved therein was added to the first liquid solution, whereby a second liquid solution was prepared. Subsequently, 45 g of Si particles with the mean particle diameter of 0.15 μm were added to the second liquid solution, the solvent was removed from the mixture, and the resultant was baked in a non-oxidizing atmosphere of nitrogen at 1,000° C., thereby obtaining Si particles with Li-containing oxide coatings containing Li and Ti as the metal element M.

Example 3

A first liquid solution was prepared by dissolving 0.02 mol of Zr-propoxide and 0.04 mol of ethyl acetoacetate in an isopropanol solvent. Then, an ethanol solution having 0.002 mol of lithium acetate dihydrate dissolved therein was added to the first liquid solution, whereby a second liquid solution was prepared. Subsequently, 69 g of Si particles with the mean particle diameter of 0.15 μm were added to the second liquid solution, the solvent was removed from the mixture, and the resultant was baked in a non-oxidizing atmosphere of nitrogen at 1,000° C., thereby obtaining Si particles with Li-containing oxide coatings containing Li and Zr as the metal element M.

Example 4

To 50 g of lithium silicate solution of 4.6 mass % at a molar ratio of Si/Li=3.9, 63 g of Si particles with the mean particle diameter of 0.15 μm were added, the solvent was removed from the mixture, and the resultant was baked in a non-oxidizing atmosphere of nitrogen at 1,000° C., thereby obtaining Si particles with Li-containing oxide coatings containing Li and Si as the metal element M.

Example 5

A first liquid solution was prepared by dissolving 0.02 mol of Al-sec-butoxide and 0.02 mol of ethyl acetoacetate in an isopropanol solvent. Then, an ethanol solution having 0.002 mol of lithium acetate dihydrate dissolved therein was added to the first liquid solution, whereby a second liquid solution was prepared. Subsequently, 29 g of SiO particles with the mean particle diameter of 5 μm were added to the second liquid solution, the solvent was removed from the mixture, and the resultant was baked in a non-oxidizing atmosphere of nitrogen at 600° C., thereby obtaining SiO particles with Li-containing oxide coatings containing Li and Al as the metal element M.

Example 7

The same procedure as Example 1 was repeated except that the addition amount of Si particles was varied such that the coating weight became 5.0 mass %, and Si particles with Li-containing oxide coatings containing Li and Al as the metal element M were obtained.

Example 8

The same procedure as Example 1 was repeated except that the addition amount of lithium acetate dihydrate was varied such that the molar ratio of M/Li became 6, and Si particles with Li-containing oxide coatings containing Li and Al as the metal element M were obtained.

Comparative Example 1

Si particles with the mean particle diameter of 0.15 μm without coatings were used.

Comparative Example 2

A first liquid solution was prepared by dissolving 0.02 mol of Al-sec-butoxide and 0.02 mol of ethyl acetoacetate in an isopropanol solvent. Then, an ethanol solution having 0.04 mol of water dissolved therein was added to the first liquid solution, whereby a second liquid solution was prepared. Subsequently, 28 g of Si particles with the mean particle diameter of 0.15 μm were added to the second liquid solution, the solvent was removed from the mixture, and the resultant was baked in a non-oxidizing atmosphere of nitrogen at 1,000° C., thereby obtaining Si particles with oxide coatings not containing Li and containing Al as the metal element M.

Comparative Example 3

A first liquid solution was prepared by dissolving 0.01 mol of Al-sec-butoxide and 0.01 mol of ethyl acetoacetate in an isopropanol solvent. Then, an ethanol solution having 0.01 mol of lithium acetate dihydrate dissolved therein was added to the first liquid solution, whereby a second liquid solution was prepared. Subsequently, 18 g of Si particles with the mean particle diameter of 0.15 μm were added to the second liquid solution, the solvent was removed from the mixture, and the resultant was baked in a non-oxidizing atmosphere of nitrogen at 1,000° C., thereby obtaining Si particles with Li-containing oxide coatings containing Li and Al as the metal element M.

Comparative Example 5

The same procedure as Example 1 was repeated except that the addition amount of lithium acetate dihydrate was varied such that the molar ratio of M/Li became 4, and Si particles with Li-containing oxide coatings containing Li and Al as the metal element M were obtained.

[Preparation of Working Electrode (Negative Electrode)]

The Si particles with the Li-containing oxide coatings in an amount of 3 parts by mass and a negative electrode material comprising spheroidal natural graphite particles in an amount of 94 parts by mass, Si particles with the Li-free oxide coatings in an amount of 3 parts by mass and a negative electrode material comprising spheroidal natural graphite particles in an amount of 94 parts by mass, or SiO particles with the Li-containing oxide coatings in an amount of 7 parts by mass and a negative electrode material comprising spheroidal natural graphite particles in an amount of 90 parts by mass, as well as a binder comprising carboxymethylcellulose in an amount of 1.5 parts by mass and styrene butadiene rubber in an amount of 1.5 parts by mass were added to water and stirred, whereby a negative electrode mixture paste was prepared. The negative electrode mixture paste was evenly coated on a copper foil having a thickness of 15 μm, and water was evaporated from the dispersion medium in a vacuum at 100° C. for drying. Thereafter, the negative electrode mixture layer coated on the copper foil was pressurized by a hand press machine. In addition, the copper foil and the negative electrode mixture layer were punched into a cylindrical shape having a diameter of 15.5 mm and pressed, whereby a working electrode (negative electrode) having the negative electrode mixture layer adhered to the copper foil was prepared. The negative electrode mixture layer had a density of 1.65 g/cm$^3$.

As to the electrolytic solution, in a mixed solvent comprising 33 vol % of ethylene carbonate (EC) and 67 vol % of methylethyl carbonate (MEC), LiPF$_6$ was dissolved so as to have a concentration of 1 mol/L, whereby the non-aqueous electrolyte was prepared. Furthermore, in the negative electrodes prepared with the negative electrode materials of Example 1 and Comparative Example 3, mixed solvents each obtained by adding 5 mass % of fluoroethylene carbonate (FEC) to the above-descried mixed solvent were used for Example 6 and Comparative Example 4. In addition, a polypropylene porous body separator having a thickness of 20 μm was impregnated with the prepared non-aqueous electrolyte, whereby a separator impregnated with the electrolytic solution was prepared. A real battery can be produced based on the concept of the present invention in accordance with a known method.

[Production of Battery for Evaluation]

FIG. 1 illustrates a button-type secondary battery as a battery for evaluation.

An exterior cup 1 and an exterior can 3 were swaged at their circumferential portions to be tightly sealed, with an insulating gasket 6 being interposed between the circumferential portions. Inside thereof, a current collector 7a made of a nickel net, a cylindrical counter electrode (positive electrode 4) made of lithium foil, a separator 5 impregnated with the electrolytic solution, and a current collector 7b made of copper foil to which the negative electrode mixture 2 was adhered were superposed in this order from the inner surface of the exterior can 3; the battery is thus structured.

The working electrode (negative electrode) composed of the current collector 7b and the negative electrode mixture 2 and the counter electrode 4 adhered to the current collector 7a were superposed with the separator 5 impregnated with the electrolytic solution being held therebetween, the current collector 7b and the counter electrode 4 were then accommodated in the exterior cup 1 and the exterior can 3, respectively, the exterior cup 1 and the exterior can 3 were put on each other, and the circumferential portions of the exterior cup 1 and the exterior can 3 were swaged to be tightly sealed, with the insulating gasket 6 being interposed between their circumferential portions, whereby the battery for evaluation was produced.

The above-described evaluation results are shown in Table 1. Examples 1 to 8 reveal that the Li-ion secondary battery using the negative electrode material for Li-ion secondary battery of the present invention has the smaller reduction in the capacity of SiO$_x$ owing to the high Li-ion conductivity of the coatings, has excellent rapid charging rate and rapid discharging rate, and further has a high capacity retention rate after a cycle owing to suppression of reduction-decomposition of the electrolytic solution and the additives. The Si particles without coatings in Comparative Example 1 exhibited poor cycle characteristics due to the larger degree of decomposition of the electrolytic solution. In Comparative Examples 2, 3 and 5, the Li conductivity of the coatings was low, and therefore the reduction in the capacity of SiO$_x$ was large, while the rapid charging rate and the rapid discharging rate were low. In particular, the Si particles with Li-free, Al-containing oxide coatings of Comparative Example 2 had so poor charging properties during a cycle that the measurement failed. Comparative Example 4 reveals that the additives did not exhibit their effects, lowering the capacity retention rate after a cycle.

TABLE 1

| | Active Material Particle | | | | | | Battery properties | | | | | |
|---|---|---|---|---|---|---|---|---|---|---|---|---|
| | | Mean particle diameter (μm) | Li-containing oxide | | | | | | 1 C charging rate (%) | 2.5 C discharging rate (%) | Each cycle efficiency of 30 cycles (%) | Capacity maintenance ratio of 30 cycles (%) |
| | Type | | Element M | M/Li molar ratio | Coating weight (mace %) | Electrolytic solution Type | Initial capacity (mAh/g) | Initial efficiency (%) | | | | |
| EX1 | Si | 015 | Al | 10 | 3.5 | EC/MEC | 452 | 90.8 | 62.3 | 91.5 | 99.1 | 74.4 |
| EX2 | Si | 0.15 | Ti | 10 | 3.5 | EC/MEC | 452 | 91.0 | 60.0 | 91.0 | 99.0 | 75.0 |
| EX3 | Si | 0.15 | Zr | 10 | 3.5 | EC/MEC | 450 | 91.0 | 59.0 | 90.0 | 99.1 | 75.2 |
| EX4 | Si | 0.15 | Si | 10 | 3.5 | EC/MEC | 449 | 90.0 | 58.0 | 90.0 | 99.0 | 74.2 |
| EX5 | SiO | 5 | Al | 10 | 3.5 | EC/MEC | 447 | 86.7 | 50.7 | 83.5 | 99.7 | 90.3 |
| EX6 | Si | 0.15 | Al | 10 | 3.5 | EC/MEC 5% FEC | 454 | 90.0 | 74.0 | 92.0 | 99.7 | 88.1 |
| EX7 | Si | 0.15 | Al | 10 | 5.0 | EC/MEC | 445 | 90.5 | 61.6 | 90.5 | 99.2 | 75.0 |
| EX8 | Si | 0.15 | Al | 6 | 3.5 | EC/MEC | 448 | 89.9 | 60.2 | 89.8 | 99.0 | 74.8 |
| CE1 | Si | 0.15 | N/A | 0 | N/A | EC/MEC | 456 | 89.6 | 40.6 | 71.5 | 96.0 | 35.8 |

TABLE 1-continued

| | Active Material Particle | | Li-containing oxide | | | Battery properties | | | | | |
|---|---|---|---|---|---|---|---|---|---|---|---|
| Type | | Mean particle diameter (μm) | Element M | M/Li molar ratio | Coating weight (mass %) | Electrolytic solution Type | Initial capacity (mAh/g) | Initial efficiency (%) | 1 C charging rate (%) | 2.5 C discharging rate (%) | Each cycle efficiency of 30 cycles (%) | Capacity maintenance ratio of 30 cycles (%) |
| CE2 | Si | 0.15 | Al | Li-free | 3.5 | EC/MEC | 445 | 89.6 | 49.1 | 83.4 | 98.4 | 67.1 |
| CE3 | Si | 0.15 | Al | 0.5 | 3.5 | EC/MEC | 436 | 90.6 | 40.9 | 80.6 | 98.9 | 74.3 |
| CE4 | Si | 0.15 | Al | 0.5 | 3.5 | EC/MEC 5% FEC | 439 | 90.8 | 48.8 | 85.0 | 98.4 | 56.4 |
| CE5 | Si | 0.15 | Al | 4 | 3.5 | EC/MEC | 440 | 90.0 | 50.1 | 84.0 | 98.8 | 73.8 |

EX: Example
CE: Comparative Example

The present invention uses the negative electrode material for a Li-ion secondary battery in which at least part of particle surfaces of $SiO_x$ ($0 \leq x < 2$) as the active material has the Li-containing oxide coatings that contain Li and at least one kind of a metal element M selected from Si, Al, Ti and Zr and has a composition of M/Li>5 in molar ratio, thereby providing the negative electrode material that can sufficiently suppress excessive reduction-decomposition of the electrolytic solution owing to the presence of the active material during charging, has the high discharging capacity higher than the theoretical charging capacity of graphite, and is excellent in cycle characteristics. Accordingly, a Li-ion secondary battery using the negative electrode material for a Li-ion secondary battery of the present invention satisfies the recent demand for the higher energy density of a battery and is effective in miniaturizing a device to which the battery is mounted with improved performances. Taking advantages of its properties, the negative electrode material for a Li-ion secondary battery of the present invention can be used in a high-performance Li-ion secondary battery of a small size to a large size.

REFERENCE SIGNS LIST 1 exterior cup
2 negative electrode mixture
3 exterior can
4 counter electrode
5 separator
6 insulating gasket
7a, 7b current collector

The invention claimed is:

1. A negative electrode material for a Li-ion secondary battery, the negative electrode material having, on $SiO_x$ ($0 \leq x < 2$) particle surfaces, coatings of a Li-containing oxide that includes Li and at least one kind of a metal element M selected from Al, Ti and Zr and has a composition of M/Li≥6 in molar ratio.

2. The negative electrode material for a Li-ion secondary battery according to claim 1, wherein the M/Li is 6≤M/Li<100.

3. The negative electrode material for a Li-ion secondary battery according to claim 1, wherein a content of the Li-containing oxide is 2 to 10 mass %.

4. A negative electrode for a Li-ion secondary battery containing the negative electrode material according to claim 1.

5. A Li-ion secondary battery including the negative electrode for a Li-ion secondary battery according to claim 4.

6. A manufacturing method of a negative electrode material for a Li-ion secondary battery comprising dispersing $SiO_x$ ($0 \leq x < 2$) particles in an oxide precursor solution containing at least one kind of a metal element M selected from Al, Ti and Zr, and Li, and performing heat treatment at temperature in a range of 200 to 1,200° C. after drying, thereby obtaining the negative electrode material according to claim 1.

7. The negative electrode material for a Li-ion secondary battery according to claim 2, wherein a content of the Li-containing oxide is 2 to 10 mass %.

8. A negative electrode for a Li-ion secondary battery containing the negative electrode material according to claim 2.

9. A negative electrode for a Li-ion secondary battery containing the negative electrode material according to claim 3.

10. A negative electrode for a Li-ion secondary battery containing the negative electrode material according to claim 7.

11. A Li-ion secondary battery including the negative electrode for a Li-ion secondary battery according to claim 8.

12. A Li-ion secondary battery including the negative electrode for a Li-ion secondary battery according to claim 9.

13. A Li-ion secondary battery including the negative electrode for a Li-ion secondary battery according to claim 10.

14. A manufacturing method of a negative electrode material for a Li-ion secondary battery comprising dispersing $SiO_x$ ($0 \leq x < 2$) particles in an oxide precursor solution containing at least one kind of a metal element M selected from Al, Ti and Zr, and Li, and performing heat treatment at temperature in a range of 200 to 1,200° C. after drying, thereby obtaining the negative electrode material according to claim 2.

15. A manufacturing method of a negative electrode material for a Li-ion secondary battery comprising dispersing $SiO_x$ ($0 \leq x < 2$) particles in an oxide precursor solution containing at least one kind of a metal element M selected from Al, Ti and Zr, and Li, and performing heat treatment at temperature in a range of 200 to 1,200° C. after drying, thereby obtaining the negative electrode material according to claim 3.

16. A manufacturing method of a negative electrode material for a Li-ion secondary battery comprising dispersing $SiO_x$ (0≤x<2) particles in an oxide precursor solution containing at least one kind of a metal element M selected from Al, Ti and Zr, and Li, and performing heat treatment at temperature in a range of 200 to 1,200° C. after drying, thereby obtaining the negative electrode material according to claim 7.

17. A Li-ion secondary battery including the negative electrode for a Li-ion secondary battery according to claim 1, wherein x=0 and the Li-ion secondary battery having silicon as an active material particle has at least one of:
   (i) initial capacity of 445 mAh/g or more,
   (ii) 1C charging rate of 50.7% or more,
   (iii) 2.5C discharging rate of 89.8% or more,
   (iv) efficiency of each operation of 30 cycles of 99.0% or more, and
   (v) capacity retention rate of 30 cycles of 74.4% or more.

\* \* \* \* \*